United States Patent
Takiguchi (10) Patent No.: US 6,278,835 B1
(45) Date of Patent: Aug. 21, 2001

(54) METHOD OF CONTROLLING REPETITIVE READING OF GROUP OF PICTURES (GOP) DATA FROM A STORAGE MEDIUM, AND AN APPARATUS THEREFOR

(75) Inventor: Osamu Takiguchi, Tokyo (JP)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/073,719

(22) Filed: May 6, 1998

(51) Int. Cl.[7] ................................................. H04N 5/91
(52) U.S. Cl. .............................. 386/68; 386/111; 386/109
(58) Field of Search ................................. 386/6–8, 33, 45, 386/68, 77, 81–82, 109, 111, 125–126; H04N 5/91

(56) References Cited

U.S. PATENT DOCUMENTS

| | | | |
|---|---|---|---|
| 5,715,354 | * | 2/1998 | Iwamura et al. ...................... 386/109 |
| 5,768,466 | * | 6/1998 | Kamamura et al. ................... 386/109 |
| 5,771,331 | * | 6/1998 | Aoki et al. ............................... 386/68 |
| 5,799,129 | * | 8/1998 | Muto ........................................ 386/68 |
| 6,058,241 | * | 5/2000 | Kawamura et al. .................... 386/68 |
| 6,069,993 | * | 5/2000 | Kawara .................................... 386/68 |
| 6,078,693 | * | 6/2000 | Kawamura et al. .................... 386/68 |
| 6,078,722 | * | 6/2000 | Kawamura et al. .................... 386/68 |

* cited by examiner

Primary Examiner—Wendy R. Garber
Assistant Examiner—Vincent F. Boccio (57) ABSTRACT

System and method for reproducing information represented by data (e.g., dynamic image compressed data), stored on a storage medium, in reverse order. Group of pictures (GOP) data sets read from a storage medium are stored in a memory (e.g., a stream buffer). Each GOP data set includes a plurality of pictures sequentially ordered from a first picture to a last picture, and each picture includes corresponding picture data. A given GOP data set is read from the memory multiple times in order to reproduce the pictures of the GOP data set in reverse order. In addition to the memory, one embodiment of the system includes a decoder for decoding picture data, and a memory controller coupled to the memory and the decoder. The memory controller receives a GOP data set read from the storage medium, and stores the GOP data set in the memory. The memory controller initializes a counter by storing a value equal to a total number of the pictures in the GOP data set within the counter. The memory controller repeatedly: (i) reads a number of the pictures equal to the counter value from the stream buffer in order beginning with the first picture, (ii) provides the picture data of a last predetermined number of the pictures read from the stream buffer to the decoder; and (iii) updates the value stored in the counter by subtracting the predetermined number from the value stored in the counter, until the counter value is equal to zero.

6 Claims, 5 Drawing Sheets

METHOD OF CONTROLLING REPETITIVE READING OF GROUP OF PICTURES (GOP) DATA FROM A STORAGE MEDIUM, AND AN APPARATUS THEREFOR

BACKGROUND OF THE INVENTION

1. Field of the Invention

The present invention pertains to a decoder of dynamic image compressed data, and mainly to a controlling apparatus for repetitively reading GOP (group of pictures) data stored in a stream buffer in order to regenerate dynamic image compressed data in reverse sequence and to a method therefor.

2. Description of the Related Art

Figure 4:
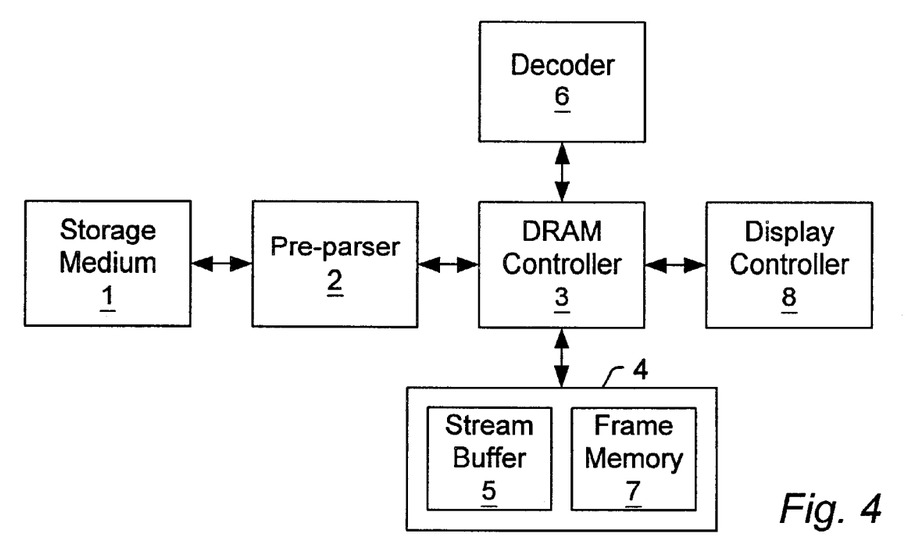
FIG. 4 is a general system block diagram for explaining an operation for regenerating dynamic image compressed data.

MPEG 1 and MPEG 2 (Moving Picture Image Coding Experts Group Phase 1) are well known as international standards for dynamic image compression. Dynamic image compressed data is regenerated and displayed by a decoder constructed in accordance with the MPEG 1 and MPEG 2 standards. FIG. 4 is a schematic block diagram of a system for decoding and displaying dynamic image compressed data read from a storage medium. System compressed data read from a storage medium 1 such as a DVD (digital video decoder), VOD (Video On Demand), CD-ROM, etc. is provided to a pre-parser 2, where the data is divided into each component information (image, sound, information file, etc.). The dynamic image compressed data which passed the pre-parser 2 is sent to a DRAM (dynamic RAM) controller 3 and is temporarily stored in a stream buffer 5 installed in a DRAM 4. The dynamic image compressed data stored in the stream buffer 5 is read at a predetermined rate under control of the DRAM controller 3 and is sent to a decoder 6. The decoder 6, which includes a variable-length decoder, reverse quantizer, reverse DCT (reverse discrete cosine transformation), movement compensation anticipation function, etc., performs a decoding operation on dynamic image compressed data in accordance with the known MPEG 2 standard. Picture data regenerated by the decoder 6 is stored as a reference picture for creating the next picture and is also sent to a display controller 8 to be displayed.

Figure 5:
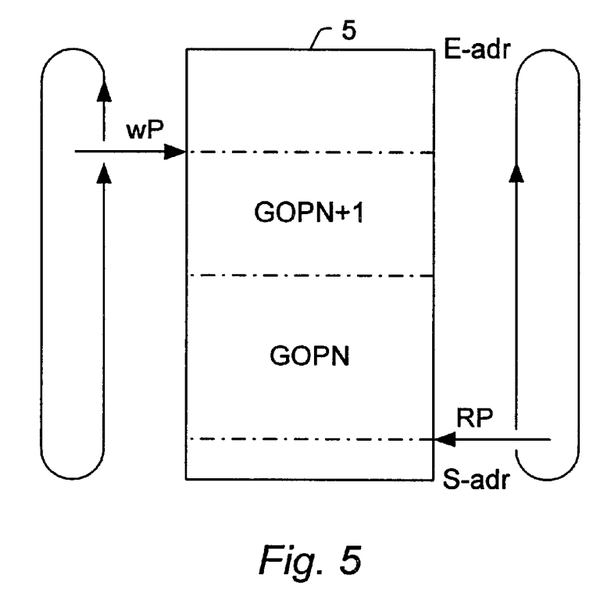
FIG. 5 is a conceptual diagram for explaining a write/read operation of GOP data into/from a stream buffer.
Figure 6:
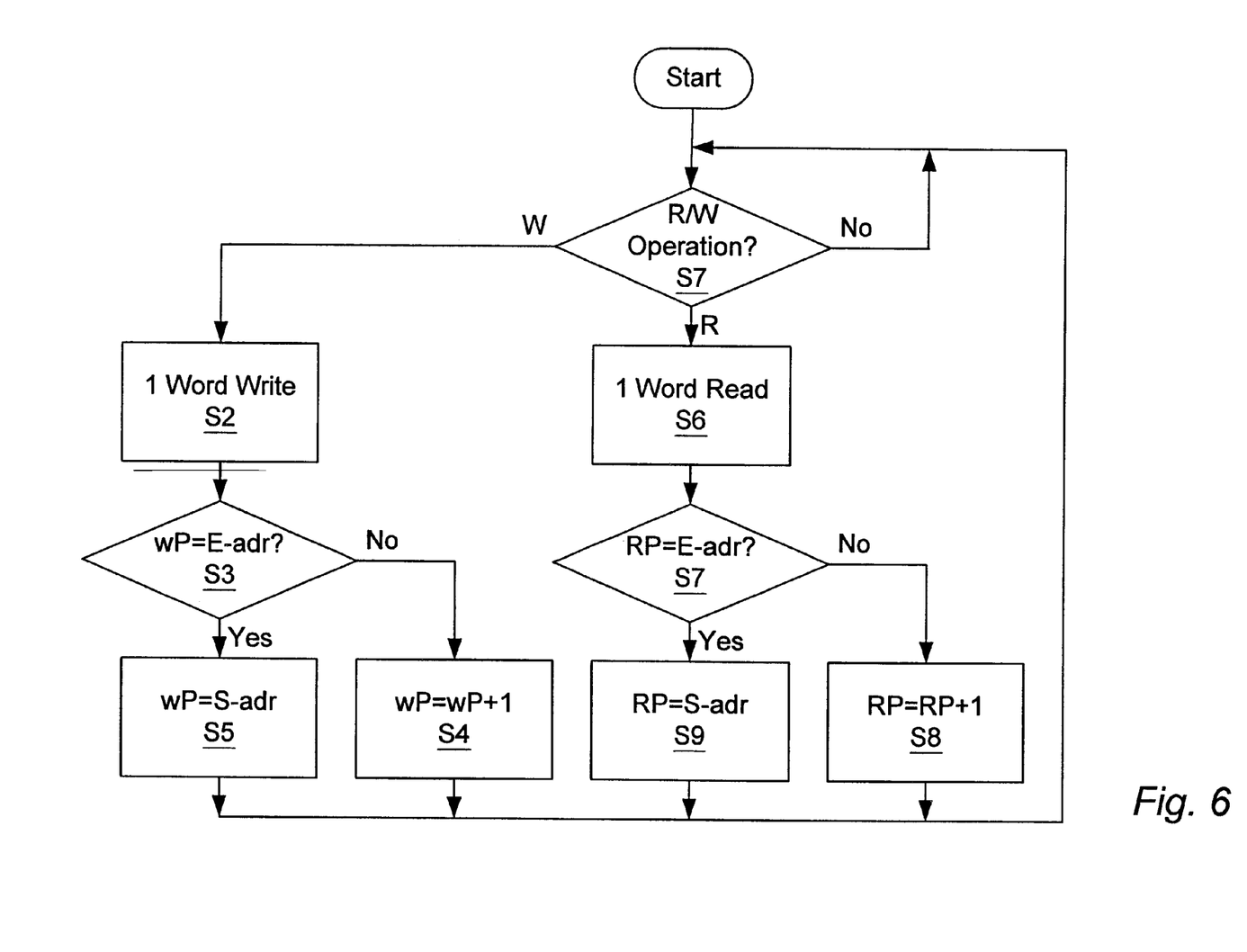
FIG. 6 is a diagram for explaining an operation for controlling write/read of GOP data into/from a stream buffer.

Next, a conventional read/write operation of the stream buffer 5 will be explained by way of FIGS. 5 and 6 for the sake of better understanding the present invention. FIG. 5 is a diagram indicating a concept of a read/write (R/W) operation of the stream buffer 5. The DRAM controller 3 conducts processing in accordance with the flow described in FIG. 6 to perform the operation indicated in FIG. 5. Dynamic image compressed data to be stored in the storage medium 1 such as a DVD, etc. consists of a collection of GOPs (groups of pictures), each of which is treated as a unit of data of several pictures using an I picture (intra coding image), P picture (forward anticipation coding image) and B picture (bidirectional anticipation coding image). Data can be accessed sequentially in GOP units. The stream buffer 5 has a storage capacity to store more than one GOP. It is assumed now that more than one GOP respectively containing N pictures (hereafter referred to as GOPN) which was read from the storage medium 1 is stored in the stream buffer 5. At step S1 in FIG. 6, it is determined whether a write operation or read operation is occurring. If it is a write operation, the processing proceeds to step S2. At step S2, image data equivalent to one word is written in an address in the stream buffer 5 pointed to by a write pointer WP. At the next step S3, it is determined whether or not the write pointer WP is pointing to the end address E-adr of the stream buffer 5. If it is determined that it is not, the processing proceeds to step S4, where 1 is added to the current address of the write pointer WP. Then, operations of steps S1~S4 are performed in the same manner as explained above, whereby the write pointer WP writes image data of GOP in the stream buffer 5 while being incremented by 1 at a time. If it is determined at step S3 that the write pointer WP has reached the end address E-adr, the processing proceeds to step S5 and the write pointer WP of the stream buffer 5 is set to point to the start address S-adr. As is indicated in FIG. 5, a write operation by the write pointer WP is performed cyclically.

On the other hand, if it is determined at the step S1 that a read operation is occurring, the processing proceeds to step S6, where image data equivalent to one word is read from an address in the stream buffer 5 pointed to by a read pointer RP. At the next step S7, it is determined whether or not the read pointer RP is pointing to the end address E-adr of the stream buffer 5. If it is determined that it is not, the processing proceeds to step S8, where 1 is added to the current address of the read pointer RP. Then, operations of the step S1 and steps S6~S8 are performed in the same manner as explained above, whereby the read pointer RP reads image data of GOP from the stream buffer 5 while being incremented by 1 at a time. If it is determined at step S7 that the read pointer RP has reached the end address E-adr, the processing proceeds to step S9 and the read pointer RP of the stream buffer 5 is set to point to the start address S-adr. As is indicated in FIG. 5, a read operation by the read pointer RP is performed on all addresses in the stream buffer 5 cyclically. If the write pointer WP has finished a round of procedure and overtaken the read pointer RP, it is not allowed to perform a write operation and instead waits by until a free space arises in the stream buffer 5.

The MPEG 1 and MPEG 2 standards provide for a trick mode. Thus, theoretically, it is possible to regenerate a dynamic image in reverse sequence as in a video deck. In order to regenerate an image in reverse sequence, a P picture or B picture constituting the last picture in GOP needs to be displayed first. In order to display the last picture, a P picture before the last P picture needs to be decoded and so on, up to the first picture of the GOP. Ultimately, all the I and P pictures (or B pictures if necessary) in the GOP need to be decoded. Therefore, if all the decoded pictures in the GOP can be stored, the GOP can be regenerated in reverse sequence. By decoding and storing a GOP preceding the regenerated GOP in the same manner while displaying the regenerated GOP and repeating the processing, theoretically, it is supposed to be possible to regenerate a dynamic image in reverse sequence. However, one GOP consists of about 15 pictures in general and thus, it is not practical in terms of cost to store all the pictures in a storage element, because memory having a large capacity is required.

The aforementioned frame memory 7 normally has a region enough for only about three pictures. Considering a memory capacity, there is another way of regenerating a dynamic image in reverse sequence. According to the other way, dynamic image compressed data is first read in units of GOP data and is written in the stream buffer 5 temporarily. Then, the GOP data is sequentially read from the stream buffer 5 to be decoded and upon storing the last three of the thus decoded pictures in the frame memory 7, the picture data is displayed in reverse sequence. After the display of the picture data in reverse sequence has been started, the same processing as mentioned above, that is processing of reading the same GOP from the storage medium 1, decoding, storing and displaying the same is repeated and subsequently, picture data of the 4th~6th pictures from the last in the GOP is displayed in reverse sequence. Thus, when a GOP contains 15 pictures, it is assumed that all the pictures in the GOP from the first to the last can be regenerated in reverse sequence by repeating the aforementioned processing five times. However, as reading GOP data from the storage medium 1 such as a DVD, etc. is conducted by using a mechanical device, a control operation becomes complicated and, as a consequence, becomes more prone to failure, malfunction, etc. Further, a control operation via mechanical means is slower than an electronic control operation.

SUMMARY OF THE INVENTION

Given the above, it is the object of the present invention to provide a control apparatus for repetitively reading GOP data which is capable of providing image data for regeneration in reverse sequence by controlling a repetitive read of one GOP data written in a frame memory from a storage medium and a method therefor.

According to the preferred embodiment of the present invention, a method of controlling repetitive read of GOP data mainly comprises a step of storing only once one GOP data read from a storage medium in a stream buffer and a step of repetitively reading more than once the GOP data stored in the stream buffer. The step of repetitively reading more than once is accomplished by reducing the GOP data stored in the stream buffer by a predetermined number of pictures at a time until the number of pictures contained in the GOP data becomes zero. Preferably, the control method comprises a step of storing the start address of GOP data stored in a stream buffer, a step of storing the end address of GOP data stored in a stream buffer, a step of counting the number of pictures contained in GOP data and storing the thus counted number as the specified number of pictures, a step of directing an address generator to the start address of the GOP data for read upon completion of read of a specified number of pictures of GOP data, a step of updating the specified number of pictures to the new specified number of pictures obtained by subtracting the predetermined number of pictures from the specified number of pictures upon completion of read of a specified number of pictures in GOP data and a step of transition to read of the next GOP data when the specified number of pictures is exhausted by the said subtraction.

A constitution of an apparatus for controlling repetitive read of GOP data of the resent invention is characterized by repetitively reading one GOP data stored in a stream buffer more than once. According to the main constitution, one GOP data stored in a stream buffer can be repetitively read more than once by reducing the GOP data by a predetermined number of pictures at a time until the number of pictures contained in the GOP data becomes zero. Preferably, the control apparatus comprises start address storage means for storing a start address of each GOP data stored in a stream buffer, end address storage means for storing an end address of each GOP data stored in the stream buffer, an address generator for repetitively reading the GOP data from its start address to its end address a predetermined number of times, means for directing the address generator to a start address for read upon completion of read of a specified number of pictures in GOP data, picture number storage means for storing the number of pictures stored in GOP data as the specified number of pictures, means for sensing completion of read of a specified number of pictures of GOP data and generating a completion GOP signal, means for updating the specified number of pictures stored in the picture number storage means to the new specified number of pictures obtained by subtracting the predetermined number of pictures from the specified number of pictures when a completion GOP signal has been generated and means for instructing transition to read of the next GOP data when the specified number of pictures stored in the picture number storage means has been exhausted.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

REFERENCE NUMERAL INDEX

1: storage medium
2: pre-parser
3: DRAM (dynamic RAM) controller
4: DRAM
5: stream buffer
6: decoder
7: frame memory
8: display controller
301: read/write (R/W) operation control part
302: picture number detection counter
303: GOP picture number counter
304: indicator
305: repetition indicator
306: address generator
307: boundary detector
308: GOP start address memory
309: GOP end address memory

DETAILED DESCRIPTION OF THE PREFERRED EMBODIMENT

The system block diagram in FIG. 4 will also be referred to as a schematic diagram for explaining decoding/display of dynamic image compressed data to grasp an overall constitution of the present invention. It is noted that the components comprised in FIG. 4 may be implemented in various ways, including ASICs, discrete logic, one or more processing units, e.g., a programmable CPU, DSP or microcontroller, programmable logic, e.g., an FPGA, or a combination of two or more of the above, among other methods.

In FIG. 4, in the forward regeneration mode, dynamic image compressed data read from a storage medium 1 passes a pre-parser 2 and DRAM controller 3 to be temporarily stored in a stream buffer 5. The stream buffer 5 has a storage capacity of more than one GOP data. Dynamic image compressed data is written in the stream buffer 5 until the buffer 5 becomes full to its capacity and as a result, more than one GOP data is stored in the stream buffer 5. Simultaneously, as is explained in FIGS. 5 and 6, the dynamic image compressed data stored in the stream buffer 5 is sequentially read at a predetermined rate in a cyclical manner under control of the DRAM controller 3 and is sent to a decoder 6 to be decoded. The thus decoded data is stored in a frame memory 7 of the DRAM 4 as a reference picture for generating the next picture while a regenerated image is displayed under control of a display controller 8. At this time, dynamic image compressed data is read from the stream buffer 5 and at the same time, new dynamic image compressed data is written, via the DRAM controller 3, in the storage area, from which the dynamic image compressed data was read. The aforementioned regeneration operation is performed in accordance with the prior art control technique described in FIGS. 5 and 6.

Figure 1:
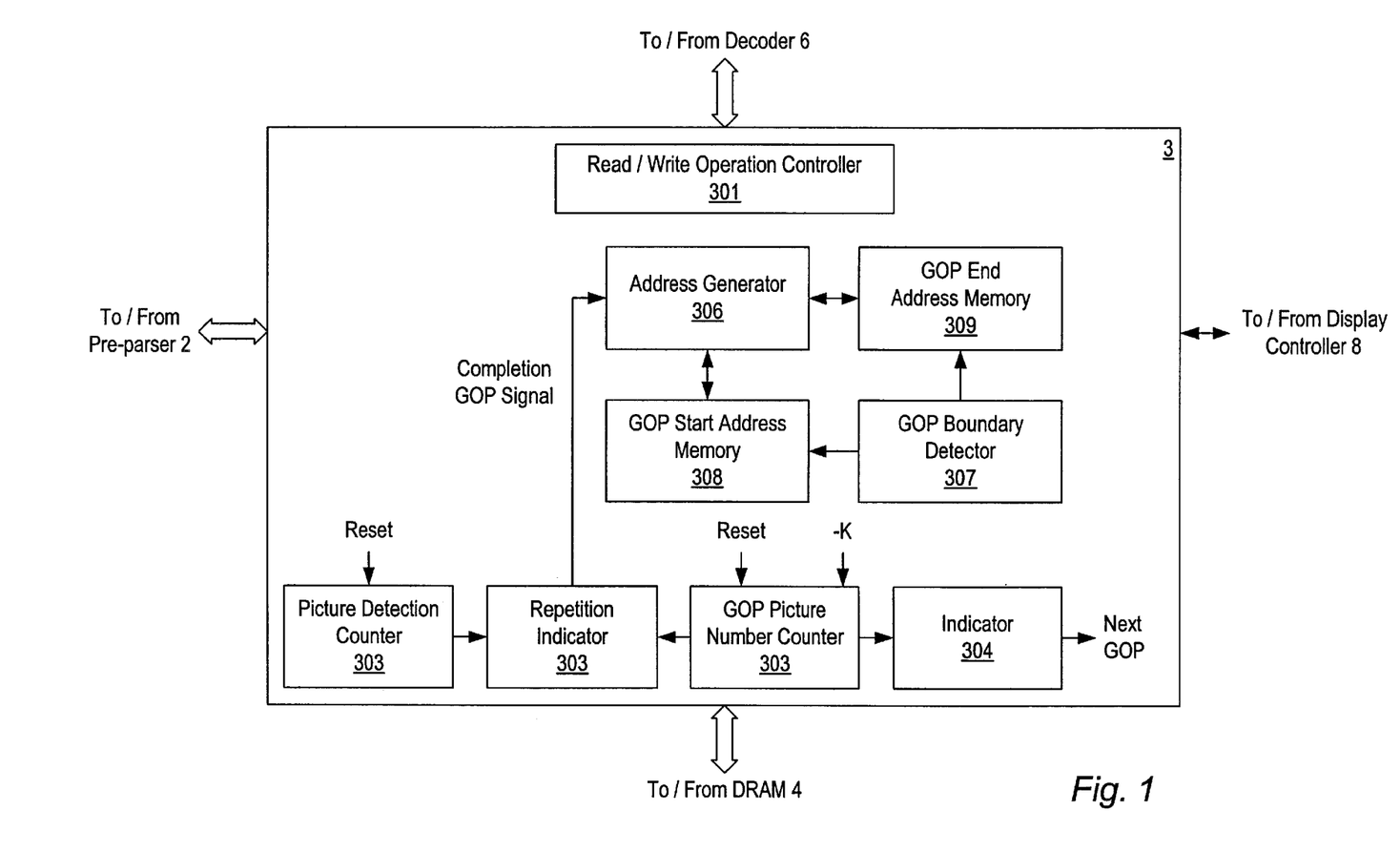
FIG. 1 is a block diagram indicating a constitution of a DRAM controller of the present invention.

FIG. 1 shows an embodiment of a preferable DRAM controller 3 as an apparatus for controlling repetitive read of GOP data according to the present invention. It is noted that the components comprised in the DRAM controller 3 of FIG. 1 may be implemented in various ways, including ASICs, discrete logic, one or more processing units, e.g., a programmable CPU, DSP or microcontroller, programmable logic, e.g., an FPGA, or a combination of two or more of the above, among other methods or means of construction.

In FIG. 1, the DRAM controller 3 includes a read/write (R/W) operation control part 301 for controlling the DRAM controller 3 as a whole. The DRAM controller 3 controls receipt/transmission of data from/to the pre-parser 2, DRAM 4, decoder 6 and display controller 8. A picture number detection counter 302 detects the pictures contained in GOP read from the stream buffer 5 for decoding, counts the thus detected pictures and also makes the counted number zero when it receives a reset signal. A GOP picture number counter (GOPPC) 303 specifies the number of pictures in one GOP to be read from its start address to its end address, and the total number of pictures contained in the GOP, which is an initial value of the counter 303, is set as the specified number of pictures. Every time a GOP is read, the initial value is counted down by K, whereby the specified number of pictures continues to be updated. When the specified number is exhausted and the processing proceeds to read of a new GOP, the initial value of the counter 303 is reset to be the number of pictures contained in the new GOP. K is a positive integer and is usually set to be the number of pictures (which generally corresponds to the number of pictures that can be stored in the frame memory 7) which can be stored at the time of regeneration in reverse sequence during one time read of GOP. For example, if the number of pictures which the frame memory 7 can store is 3, K is set to be 3. An indicator 304 monitors the content of the GOP picture number counter 303 and outputs an instruction to proceed to read of the next GOP from the stream buffer 5 when the specified number of pictures stored in the counter 303 becomes zero.

When the number of pictures counted by the picture number detection counter 302 becomes the same as the specified number of pictures stored in the GOP picture number counter 303, a repetition indicator 305 outputs to an address generator 306 a completion GOP signal to indicate that one time read of GOP has been completed. Since the address generator 306 has a function of cyclically updating an address within a range between the start address and the end address of the GOP which is currently being read, it automatically returns to the start address of the GOP upon receipt of the completion GOP signal. A GOP boundary detector 307 has a function of detecting the location of a boundary between each GOP data to be stored in the stream buffer 5 and extracts the start address and end address of each GOP. The extracted start address of each GOP is stored in a GOP start address memory 308, while the extracted end address of each GOP is stored in an end address memory 309.

Figure 2:
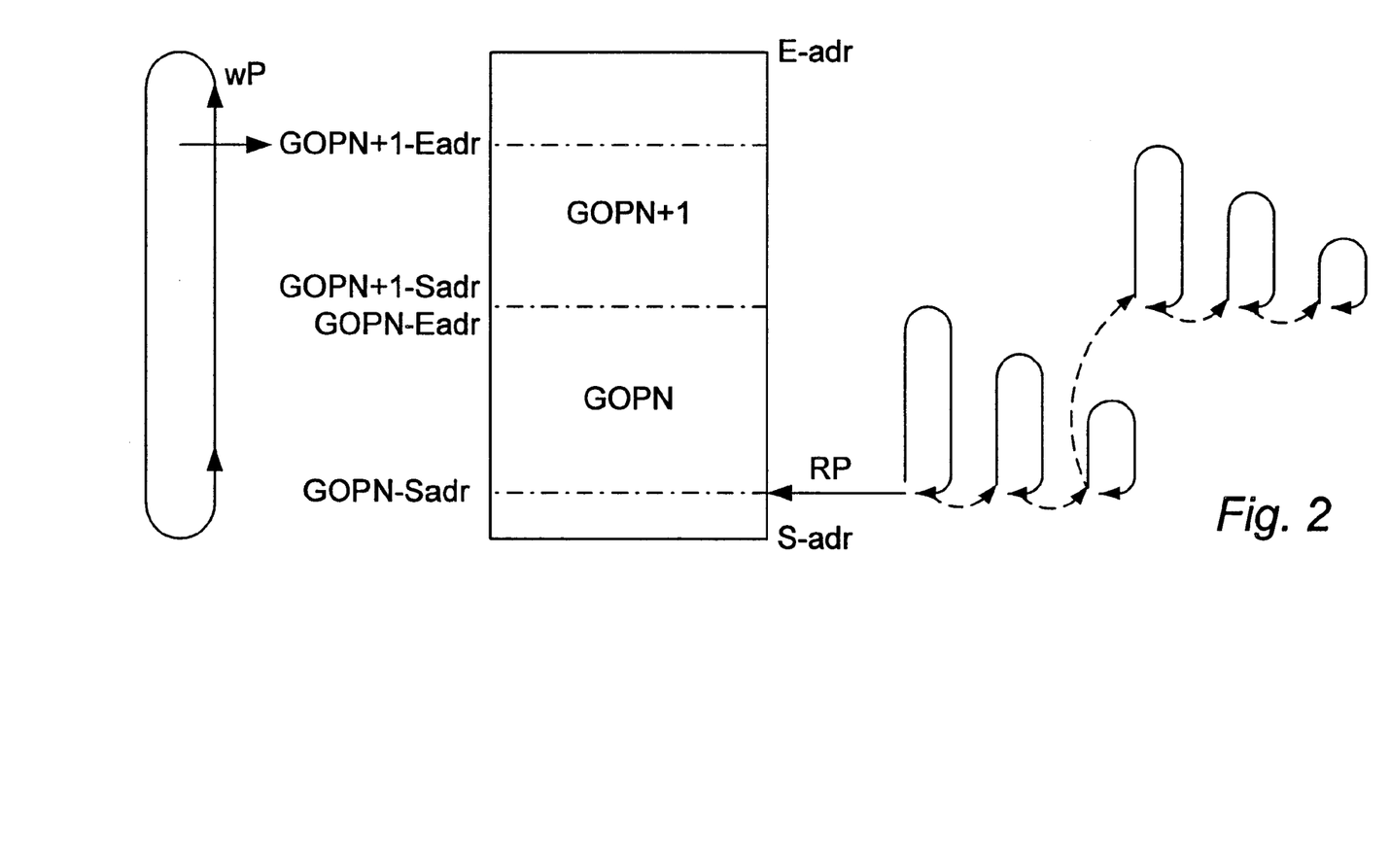
FIG. 2 is a flow chart for explaining an operation for controlling repetitive read of GOP data from a stream buffer of the present invention.

Next, an operation for controlling repetitive read of GOP data by the DRAM controller 3 having the aforementioned constitution will be explained by way of FIGS. 2 and 3. FIG. 2 is a diagram illustrating a concept of a read/write (R/W) operation by the stream buffer 5. The DRAM controller 3 executes processing in accordance with the flow in FIG. 3 at the time of regeneration in reverse sequence in order to perform the operation shown in FIG. 2. In the initial state, a write pointer WP and read pointer RP are both set at the start address S-adr of the stream buffer 5. At step S11 in FIG. 3, the method determines whether a read operation or write operation is occurring. If the operation is a write operation, the processing proceeds to step S12. At the step S12, a common cyclic write control operation comprising the operations of the steps S2~S5 explained in FIG. 6 is performed. As a result, as is indicated in FIG. 2, GOP data read from the storage medium 1 such as the N-th GOP (GOPN), (N+1)-th GOP (GOPN+1), etc. is stored in the stream buffer 5 by a one time cyclic write operation until the stream buffer 5 becomes full to its storage capacity, On the other hand, if it is determined at the step S11 that it is a read operation, the processing proceeds to step S13, where image data equivalent to one word is read from an address in the stream buffer 5 pointed to by the read pointer RP. Next, the processing proceeds to step S14, where the method determines whether or not a completion GOP signal was output from the repetition indicator 305 as a result of the read operation conducted at the step S13. If it turns out that the completion GOP signal was not output, the read pointer RP is maintained at the current address and the processing proceeds to step S15. At the step S15, it is determined whether or not the read pointer RP is pointing to the end address GOPN-E adr of the GOPN which is currently being read. If it is determined that it is not, the processing proceeds to step S16 and 1 is added to the current address of the read pointer RP. On the other hand, if it is found that the read pointer RP is pointing to the end address GOPN-E adr, it is decided that one time read of all the data (that is, a specified number of pictures) from the start address to the end address of the GOPN has been completed and thus, the processing proceeds to step S17, where the read pointer RP is set at the start address GOPN-E adr of the GOPN in order to execute read of the GOPN for the second time. Next, the processing proceeds to step S18, where the specified number of pictures stored in the GOP picture number counter (GOPPC) 303 is updated to the specified number of pictures (PCCT-K) obtained by subtracting K from the initial specified number of pictures, that is the total number of pictures (PCCT) contained in the GOPN. Next, the processing proceeds to step S19, where the total number of pictures in GOPN counted by the picture number detection counter 302 is reset to be zero.

On the other hand, if it is determined at the step S14 that a completion GOP signal is outputted from the repetition indicator 305, it is decided that read of a specified number of pictures in GOPN has been completed and thus, the processing proceeds to step S20. At the step S20, the specified number of pictures stored in the GOP picture number counter (GOPPC) 303 is updated to the specified number of pictures (GOPPC−K) obtained by subtracting K from the current specified number of pictures. Next, the processing proceeds to step S21, where it is determined whether or not the updated specified number of pictures in the GOP picture number counter 303 is not more than 1. In other words, it is determined whether or not a repetitive read of a required number of pictures in the GOPN has been completed. If it is determined that it has not, the processing proceeds to step S22, where the read pointer RP is set at the start address GOPN−S adr of the GOPN to repeat read of the GOPN from its start address all over again. Next, the processing proceeds to step S23, where the number of pictures of the GOPN in the picture number detection counter 302 is reset to be zero.

If it is determined at the step S21 that the repetitive read of a required number of pictures in the GOPN has been completed, the processing proceeds to step S24, where the read pointer RP is set at the start address GOPN+1−S adr of the next data GOPN+1 to prepare for read of the GOPN+1. Next, the processing proceeds to step S25, where read of the N-th GOP is updated to read of the (N+1)-th GOP. Next, the processing proceeds to step S26, where the GOP picture number counter 303 and picture number detection counter 302 are reset and the total number of pictures contained in the GOPN+1 is set anew as the specified number of pictures in the GOP picture number counter 303 in response to the read of the next (N+1)-th GOP, while the number of pictures of GOPN in the picture number detection counter 302 is reset to be zero.

Figure 3:
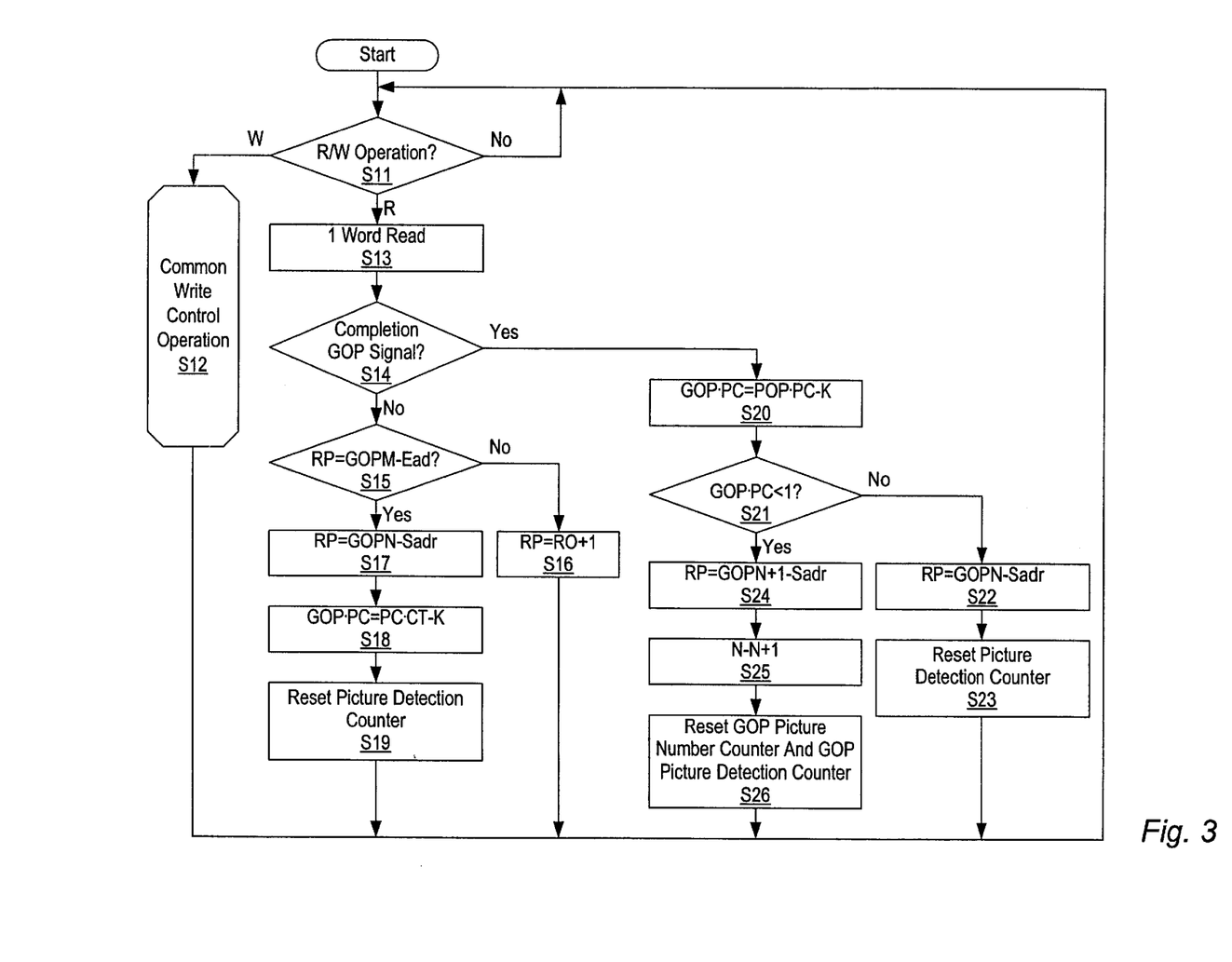
FIG. 3 is a conceptual diagram for explaining an operation for controlling repetitive read of GOP from a stream buffer of the present invention.

As is indicated in FIG. 3, GOPN is repeatedly read more than once (three times in the example shown in FIG. 3) by reducing the number of pictures in the GOPN by K at a time. In the case where the write pointer WP has overtaken the start address GOPN−S adr of the GOPN after one round, write into the stream buffer 5 is halted until the GOPN has been read a required number of times and the processing has proceeded to read of the next GOPN+1.

For example, assuming that 15 pictures are contained in GOPN and K is equal to 3, the number 15 is first set in the GOP picture number counter 303 as the specified number in read of the GOPN. Then, operations in a loop of steps of S11 and S13~S16 are performed to read all the 15 pictures in the GOPN, and the last three of the read pictures are stored in the frame memory 7 to be utilized for regeneration in reverse sequence. Next, operations in the steps S11, S13~S15, S17 and S18 are performed and the specified number in the GOP picture number counter 303 is updated to 12. Next, operations in a loop of steps of S11 and S13~S16 are conducted to read the twelve pictures in the GOPN and the last three of the read pictures are utilized for regeneration in reverse sequence. Next, operations in the steps S11, S13, S14 and S20~S23 are performed and the specified number in the GOP picture number counter 303 is updated to 9. In the same manner as described above, operations in a loop of the steps S11, S13~S16 and operations in the steps S11, S13, S14, S20~S23 are sequentially repeated three times. As a result, the specified number in the GOP picture number counter 303 is sequentially updated to 6, 3, and finally to 0 while nine pictures, six pictures and three pictures in the GOPN are sequentially read and the last three of the respective read pictures are utilized for regeneration in reverse sequence. Thus, all the 15 pictures in the GOPN are regenerated and displayed in reverse sequence. Lastly, operations in the steps S11, S13, S14, S20, S21 and S24~S26 are performed to complete read of the GOPN and subsequently, the processing proceeds to read of the next data GOPN+1.

If K is equal to 0, either operations in the steps S11, S13~S16 or operations in the steps S11, S13, S14, S15, S17 and S18 in FIG. 3 are performed, which means that the GOP which is currently being read will be read repetitively and infinitely. In this case, a control line for outputting a completion GOP signal and another control line for instructing read of the next GOP may be laid between a system controller (not indicated in the drawing) and the DRAM controller 3, whereby a read pointer goes back to the start address of the GOP which is currently being read or moves on to the start address of the next GOP. For example, in order to read GOPN for the (M+1)-th time after reading it M times, a completion GOP signal is output to perform operations in the steps S14, S20~S23 and the read pointer RP is set at the start address of the GOPN. On the other hand, in order to read the GOPN M times and complete the read operation for the GOPN, read of the next GOP is instructed and operations in the steps S24~S26 are performed.

Although the present invention has been explained by way of the circuit diagram in FIG. 1 and the flow chart in FIG. 2, it will be in no way restricted by the above-described embodiment and the above flow may be constructed as hardware, that is a state machine, instead of software. Needless to say, the present invention may include all changes and modifications which could be devised by a person with ordinary skill in the art and come within the spirit of the invention.

According to the present invention, GOP data can be stored in a stream buffer only once and the thus stored GOP data can be read more than once, whereby repetitive read from a front end (from a channel decoder or disk drive) becomes unnecessary and thus, a read operation can be controlled more easily and promptly in a safer manner. Further, since GOP can be repetitively read from a stream buffer as many times as desired, the number of times of repetitive read can be set according to an employed decoder. Still further, a predetermined number of pictures can be reduced from the pictures contained in GOP data every time the GOP data is read, whereby unnecessary read of GOP data is avoidable. Thus, the present invention is suitable for regeneration of a dynamic image in reverse sequence and the application of the present invention to regeneration in reverse sequence is quite advantageous.

Numerous variations and modifications will become apparent to those skilled in the art once the above disclosure is fully appreciated. It is intended that the following claims be interpreted to embrace all such variations and modifications.

What is claimed is:

1. A method of reproducing information represented by data stored on a storage medium, comprising:

storing a group of pictures (GOP) data set read from the storage medium in a stream buffer, wherein the GOP data set includes a plurality of pictures sequentially ordered from a first picture to a last picture;

initializing a counter value to a total number of the pictures in the GOP data set;

repeating the following until the counter value is equal to zero:

reading a number of the pictures equal to the counter value from the stream buffer in order beginning with the first picture;

decoding a last predetermined number of the pictures read from the stream buffer; and updating the counter value by subtracting the predetermined number from the counter value.

2. A method for reproducing information represented by data stored on a storage medium, comprising:

storing a start address of a group of pictures (GOP) data set, wherein the GOP data set includes a plurality of pictures sequentially ordered from a first picture to a last picture;

storing an end address of the GOP data set;

counting a total number of the pictures in the GOP data set, initializing a counter by storing a value equal to the total number of the pictures in the GOP data set within the counter; directing an address generator to the start address of the GOP data set, wherein the address generator is configured to provide sequential addresses within an address range extending from the start address of the GOP data set to the end address of the GOP data set;

repeating the following until the value stored in the counter is equal to zero:

reading a number of the pictures equal to the value stored in the counter from the stream buffer in order beginning with the first picture;

decoding a last predetermined number of the pictures read from the stream buffer; and updating the value stored in the counter by subtracting the predetermined number from the value stored in the counter.

3. The method as recited in claim 1 or 2, wherein the method is performed to reproduce the pictures of the GOP data set in reverse order.

4. An apparatus for reproducing information represented by data stored on a storage medium, comprising:

a memory for storing data;

a decoder for decoding picture data;

a memory controller coupled to the memory and the decoder, wherein the memory controller comprises a counter and is configured to:

receive a group of pictures (GOP) data set read from the storage medium, wherein the GOP data set includes a plurality of pictures sequentially ordered from a first picture to a last picture, and wherein each of the pictures comprises corresponding picture data;

store the GOP data set in the memory;

initialize the counter by storing a value equal to a total number of the pictures in the GOP data set within the counter; and repeatedly: (i) read a number of the pictures equal to the counter value from the stream buffer in order beginning with the first picture, (ii) provide the picture data of a last predetermined number of the pictures read from the stream buffer to the decoder; and (iii) update the value stored in the counter by subtracting the predetermined number from the value stored in the counter, until the counter value is equal to zero.

5. The apparatus as recited in claim 5, wherein the memory controller comprises:

start address storage means for storing a start address of the GOP data set when the GOP data set is stored in the memory;

end address storage means for storing an end address of the GOP data set when the GOP data set is stored in the memory;

an address generator for providing sequential addresses within an address range extending from the start address of the GOP data set to the end address of the GOP data set; and means for directing the address generator to provide the start address of the GOP data set.

6. The controlling apparatus as defined in claim 4 or 5, wherein the memory controller is configured to reproduce the pictures of the GOP data set in reverse order.

\* \* \* \* \*